US011423514B2

(12) United States Patent
Kiser et al.

(10) Patent No.: US 11,423,514 B2
(45) Date of Patent: Aug. 23, 2022

(54) IMAGE PROCESSING NOISE REDUCTION

(71) Applicant: Contrast, Inc., Albuquerque, NM (US)

(72) Inventors: Willie C. Kiser, Albuquerque, NM (US); Michael D. Tocci, Albuquerque, NM (US); Nora Tocci, Albuquerque, NM (US)

(73) Assignee: Contrast, Inc., Albuquerque, NM (US)

( * ) Notice: Subject to any disclaimer, the term of this patent is extended or adjusted under 35 U.S.C. 154(b) by 98 days.

(21) Appl. No.: 16/539,595

(22) Filed: Aug. 13, 2019

(65) Prior Publication Data

US 2020/0058104 A1 Feb. 20, 2020

Related U.S. Application Data

(60) Provisional application No. 62/718,595, filed on Aug. 14, 2018.

(51) Int. Cl.
*G06T 5/00* (2006.01)
*G06T 5/10* (2006.01)
*G06T 5/20* (2006.01)
*H04N 5/357* (2011.01)

(52) U.S. Cl.
CPC .............. *G06T 5/002* (2013.01); *G06T 5/007* (2013.01); *G06T 5/10* (2013.01); *G06T 5/20* (2013.01); *H04N 5/357* (2013.01); *G06T 2207/20052* (2013.01); *G06T 2207/20182* (2013.01)

(58) Field of Classification Search
CPC .. G06T 5/002; G06T 5/10; G06T 5/20; G06T 5/007; G06T 2207/20052; G06T 2207/20182; G06T 2207/10016; H04N 5/357
See application file for complete search history.

(56) References Cited

U.S. PATENT DOCUMENTS

| 5,881,180 | A | 3/1999 | Chang et al. |
| 9,800,856 | B2* | 10/2017 | Venkataraman ..... H04N 13/106 |
| 10,038,855 | B2* | 7/2018 | Cote .......................... G06T 5/50 |
| 2003/0138154 | A1 | 7/2003 | Suino |
| 2004/0202376 | A1* | 10/2004 | Schwartz ................ G06T 9/007 |
| | | | 382/244 |

(Continued)

OTHER PUBLICATIONS

Buemi A et al, Chroma Noise Reduction in DCT Domain Using Soft-Thresholding, 2010, EURASIP Journal on Image and Video Processing, 1-15. (Year: 2010).*

(Continued)

*Primary Examiner* — Matthew C Bella
*Assistant Examiner* — Kathleen M Broughton
(74) *Attorney, Agent, or Firm* — Brown Rudnick LLP; Thomas C. Meyers

(57) ABSTRACT

Noise reduction in images is provided by performing a noise reduction step on blocks of pixels within a video-processing pipeline. The noise reduction step consists of applying a discrete cosine transform (DCT) to the block of pixels, quantizing the resulting DCT coefficients, and performing an inverse of the DCT to the quantized coefficients. The output of that noise reduction step is a block of image pixels similar to the input pixels, but with significantly less image noise. Because the noise reduction step can be performed quickly on small blocks of pixels, the noise reduction can be performed in real-time in a video processing pipeline.

12 Claims, 9 Drawing Sheets

(56) References Cited

U.S. PATENT DOCUMENTS

| | | | |
|---|---|---|---|
| 2007/0133889 A1 | 6/2007 | Horie et al. | |
| 2008/0037883 A1 | 2/2008 | Tsutsumi et al. | |
| 2008/0304562 A1 | 12/2008 | Chang et al. | |
| 2010/0098333 A1 | 4/2010 | Aoyagi | |
| 2010/0149546 A1* | 6/2010 | Kobayashi | G01B 9/02042 356/511 |
| 2010/0266008 A1* | 10/2010 | Reznik | G06F 17/147 375/240.2 |
| 2013/0064448 A1 | 3/2013 | Tomaselli et al. | |
| 2015/0215595 A1 | 7/2015 | Yoshida | |
| 2016/0205341 A1* | 7/2016 | Hollander | H04N 7/015 375/240.08 |
| 2016/0360213 A1* | 12/2016 | Lee | H04N 1/60 |
| 2017/0084006 A1* | 3/2017 | Stewart | G06F 16/51 |
| 2017/0238029 A1 | 8/2017 | Kiser et al. | |
| 2018/0054566 A1* | 2/2018 | Yaguchi | H04N 19/82 |
| 2018/0063537 A1* | 3/2018 | Sasai | H04N 19/13 |

OTHER PUBLICATIONS

Robertson et al, DCT Quantization Noise in Compressed Images, 2005, IEEE Transactions on Circuits and Systems for Video Technology, 15(1): 27-38. (Year: 2005).*

Lukin et al, Discrete cosine transform-based local adaptive filtering of images corrupted by nonstationary noise, 2010, Journal of Electronic Imaging, 19(2): 1-15. (Year: 2010).*

Seo et al, Noise reduction for digital holograms in a discrete cosine transform (DCT) domain, 2009, Optica Applicata, XL(4): 991-1005 (Year: 2009).*

International Search Report and Written Opinion dated Dec. 10, 2019, for PCT/US19/046350, filed Aug. 13, 2019 (10 pages).

International Search Report and Written Opinion dated Dec. 6, 2019, for PCT/US19/46348, filed Aug. 13, 2019 (9 pages).

Jack, 2005, Color spaces, Chapter 3 in Video Demystified: A Handbook for the Digital Engineer, 4Ed, Newnes (20 pages).

Kresch, 1999, Fast DCT domain filtering using the DCT and the DST, IEEE Trans Imag Proc (29 pages).

Nosratinia, 2002, Enhancement of JPEG-compressed images by re-application of JPEG, Journal of VLSI signal processing systems for signal, image and video technology.

Roberts, 2017, Lossy Data Compression: JPEG, Stanford faculty page (5 pages) Retrieved from the Internet on Feb. 3, 2017, from <https://cs.stanford.edu/people/eroberts/courses/soco/projects/data-compression/lossy/jpeg/dct.htm>.

Sedigh, 1998, Evaluation of filtering mechanisms for MPEG video communications, IEES Symp Rel Dist Sys (6 pages).

Unattributed, 2018, JPEG YCbCr Support, Microsoft (14 page) Retrieved from the Internet on Nov. 20, 2019 from <https://docs.microsoft.com/en-us/windows/win32/wic/jpeg-ycbcr-support>.

* cited by examiner $$D(i,j) = \frac{1}{\sqrt{2N}} C(i)C(j) \sum_{x=0}^{N-1} \sum_{y=0}^{N-1} p(x,y) \cos\left[\frac{(2x+1)i\pi}{2N}\right] \cos\left[\frac{(2y+1)j\pi}{2N}\right] \quad (801)$$

FIG. 8

$$T_{i,j} = \begin{cases} \dfrac{1}{\sqrt{N}} & \text{if } i = 0 \\ \sqrt{\dfrac{2}{N}} \cos\left[\dfrac{(2j+1)i\pi}{2N}\right] & \text{if } i > 0 \end{cases} \quad (805)$$

FIG. 9

IMAGE PROCESSING NOISE REDUCTION

CROSS-REFERENCE TO RELATED APPLICATION(S)

This application claims benefit of U.S. Provisional Application No. 62/718,595, filed Aug. 14, 2018, all incorporated by reference.

TECHNICAL FIELD

The disclosure relates to video processing.

BACKGROUND

Image "noise" is characterized by random variations in color and/or intensity not present in the image itself. In image processing, noise is introduced as unwanted electrical fluctuations that manifest themselves as perceptible (and imperceptible) flaws in the resulting image (whether static or video). Noise can be caused, for example, by poor illumination, analog-to-digital converter errors, or simply random statistical fluctuations in the number of photons detected during image exposure.

Noise in digital images can potentially be reduced using digital image processing systems. Some existing approaches to noise reduction involve performing a fast Fourier transform to convert a digital image into the frequency domain so that a high-frequency filter can be applied to the image. Such operations can require substantial computational and storage resources. The original image gets transformed into a complex function of frequency, with each frequency component requiring a complex number to represent amplitude and phase at that frequency. Due to the amount of processing time and data involved, image processing algorithms are not well suited to real-time video applications, such as live news and sports broadcasting, autonomous vehicle control systems, high-throughput film and video productions, and some consumer electronics like cell phone cameras or video baby monitors. Thus, improvements in noise reduction in both video and static image processing are needed.

SUMMARY

The invention provides noise reduction methods in an image processing pipeline. Methods of the invention are particularly well-suited to video processing. In a preferred embodiment, noise reduction comprises applying a discrete cosine transform (DCT) to pixel blocks, quantizing the resulting DCT coefficients, and performing an inverse quantization and DCT prior to further processing. Because noise reduction is performed quickly on small blocks of pixels, it can be applied to real-time video processing. In particular, noise reduction methods of the invention are applicable to high-dynamic-range video processing. Unlike standard data compression technologies, quantized DCT coefficients are not subject to compression or entropy encoding. Instead, the full and complete set of quantized DCT coefficients is simply passed back through the inverse DCT and through a video processing algorithm. Noise reduction methods of the invention can occur on a chip as a self-contained loop, with image pixels flowing in and essentially similar but "cleaned up" image pixels flowing out, and thus can be added to a digital video processing pipeline without otherwise disrupting the design and logic of the pipeline.

Pixels flow through the noise reduction step in real-time. In some embodiments, the noise reduction step operates on 8×8 blocks. There is no requirement to accumulate, or save, or operate on an entire frame of data (e.g., no need to park 1920×1080 pixels on the chip anywhere). Because the pixels flow through the noise reduction step in real-time, the noise reduction can be implemented in real-time video processing systems. The noise reduction can be performed on video or still images and can be implemented in any suitable camera such as a general purpose digital camera or a camera on a phone, or on a specialty camera such as a multi-sensor, high dynamic range (HDR) camera. Preferred embodiments that include the noise reduction step within a real-time HDR video camera are described in greater detail herein.

In some embodiments, the noise reduction step is implemented by employing frequency domain processing of image data. Accordingly, block-based DCT and quantization of image data represented in the frequency domain may be combined with an inverse of the DCT to create a live video stream that can be displayed immediately on a video screen with no lag and can also be suitable for broadcast. The block-based steps (DCT, quantization, and inverse-DCT) can easily be implemented in firmware. Thus the invention provides a noise reduction method that comprises a block-based DCT, data quantization, inverse data quantization, and an inverse DCT as a novel method of image noise reduction. This method is especially useful for treatment of HDR video data and even more useful in a pipeline for real-time image processing. In most preferred embodiments, the noise reduction step is block-based and is applied to only a very small block of an entire image at a time (as opposed to performing the operations on an entire image all at once, which would require reading the entire image into the pipeline first).

Thus, the invention comprises the application of a DCT to an image in order to effect noise reduction. Traditionally, DCT has been used for data compression and is not used in connection with image-processing or noise-reduction. Additionally, frequency domain filtering has not been used for noise reduction in a "block-based" method. The existing paradigm has been to use DCT and quantization within, for example, a JPEG compression algorithm in order to obtain a quantization matrix that is amenable to compression by Huffman encoding. It has not been suggested to reverse the DCT to arrive at an uncompressed (but quantized) image, because to do so contradicts the purpose for which the JPEG process is applied. Performing the inverse DCT (e.g., without any Huffman encoding) maintains essentially the original volume of data, but loses some of the original data. That lost data is image noise, so performing the noise reduction step as described provides better images that would be obtained otherwise and can be implemented in a real-time image processing pipeline and thus can be used in live streaming digital video.

Other noise-reduction methods, such as 3D or spatial-based noise reduction are memory- and hardware-intensive, and too slow to really be considered "real-time". It may be found that methods of this disclosure produce better images than those other 3D noise reduction techniques. Additionally, methods of the present disclosure stand in contrast to other emerging methods of noise reduction which tend to be more- and overly-complicated likely because more computing power is available now than before. In contrast, methods of the present disclosure are simple and effective.

In certain aspects, the invention provides a method of removing noise from images. The method includes obtaining data from at least one image sensor and performing a noise reduction step. The noise reduction step comprises (and preferably consists of) performing a discrete cosine transform (DCT) on the data to get DCT values, quantizing the DCT values, and performing an inverse of the DCT on the DCT values to yield image data. The image data is provided for displaying, broadcasting, or storing as a digital image.

The method may include performing the noise reduction step on an N×N block of pixels for 2<N<16. In preferred embodiments, N=8.

Quantizing the DCT values may be done by dividing elements of the DCT values by corresponding elements in a quantization matrix and rounding the result.

The noise reduction step may be performed on a processing device such as a field-programmable gate array (FPGA) or an application-specific integrated circuit (ASIC) in a video camera.

In other aspects, the invention provides a method for removing noise from a real-time stream of digital image data. The real-time stream can be from a still digital image capture device or a digital video camera that is capturing multiple frames per second of scene using one or more image sensors. Data are streamed from the one or more sensors into a novel noise reduction pipeline. The pipeline can be implemented in a field programmable gate array (FPGA), an application-specific integrated circuit (ASIC), or a discrete circuit module.

The noise reduction pipeline is configured to be seamlessly inserted into any image acquisition and processing flow. The pipeline includes an interface to receive image data in any color space and convert it into a color space amenable for noise reduction. In one implementation, the pipeline's interface coverts and RGB stream of pixel values into a YCbCr color space. The pipeline processes the image via distinct channels of noise reduction processing. Specifically, the pipeline processes the luminance and each of the chroma domains of the digital image in parallel but separately. Advantageously, the pipeline is able to perform noise reduction steps that are unique to each domain as described herein. For instance, the pipeline downsamples each of the chroma components (i.e., Cb and Cr) of the digital image such that a first portion of noise is removed from the digital image.

The pipeline then performs frequency domain processing to remove a second portion of the noise. First, the image data is converted into the frequency domain such that a block (e.g., an 8×8 block) of pixel values is represented by a matrix of frequency coefficients where each coefficient represents a weight of a particular frequency waveform's contribution to the entire block of pixel values. The pipeline identifies those frequencies that are associated with noise and then removes those frequencies. The pipeline then converts the image data as defined by the remaining set of frequencies to yield noise reduced image data. This data can then be used for displaying, broadcasting, or storing as a digital image.

In some aspects, the pipeline may include one or more filters, such as a high-pass filter, low-pass filter, or band-bass filter. Each of the filters is configured to process image data that is represented in the frequency domain such that it removes a third portion of the noise. In particular, the one or more filters can be selected to filter noise that is specific to a particular digital image acquisition device and environmental conditions at the time of image acquisition. For instance, each filter can operate with particular frequency pass-through settings. In other words, each filter is configured to remove frequencies that are either below and/or above a particular range of frequencies. For example, a low-pass filter can be specifically selected to remove noise that is known to be introduced due to specific characteristics of a particular digital image acquisition device and/or environmental conditions at the time of image acquisition. Those environmental conditions can be any one of or combination of the following factors: lighting conditions, temperature, real-time fluctuations of light and/or temperature, motion of objects in a scene to be captured and/or motion of the digital acquisition device.

In certain HDR video embodiments, the video camera comprises a plurality of image sensors that include the at least one sensor, the plurality of image sensors coupled to the processing device. Preferably, the video camera is configured to stream pixel values from each of the plurality of image sensors in a frame independent manner through a pipeline on the processing device, wherein the pipeline includes a kernel operation that identifies saturated pixel values and a merge module to merge the pixel values to produce a high-dynamic range (HDR) image. Each of the sensors may include a Bayer filter. The pipeline may perform the following steps (e.g., in the recited order): synchronize, the kernel operation, a tone-mapping operations, and the noise reduction step. Preferably, the plurality of image sensors are each positioned with respect to at least one beamsplitter and a lens of the video camera such that incoming light is split onto the plurality of image sensors so that each image sensor senses an image that is identical but for light level.

The noise reduction step may be performed in any suitable color space. For example, in some embodiments, the method includes transforming the data from the at least one image sensor from an RGB color space into a $YC_BC_R$ color space and performing the noise reduction step in the $YC_BC_R$ color space.

In some smartphone and tablet embodiments, the noise reduction step is performed by a mobile personal device and the at least one sensor is part of a digital camera on the mobile personal device. Optionally, providing the image data for storing as the digital image can include converting the image data into a JPEG and storing the JPEG on a computer-readable storage medium.

BRIEF DESCRIPTION OF THE DRAWINGS

FIG. 8 gives a formula for a matrix of discrete cosine transformation (DCT) coefficients.
FIG. 9 gives a matrix T that yields DCT coefficients when multiplied by pixel values M.

DETAILED DESCRIPTION

Figure 1:
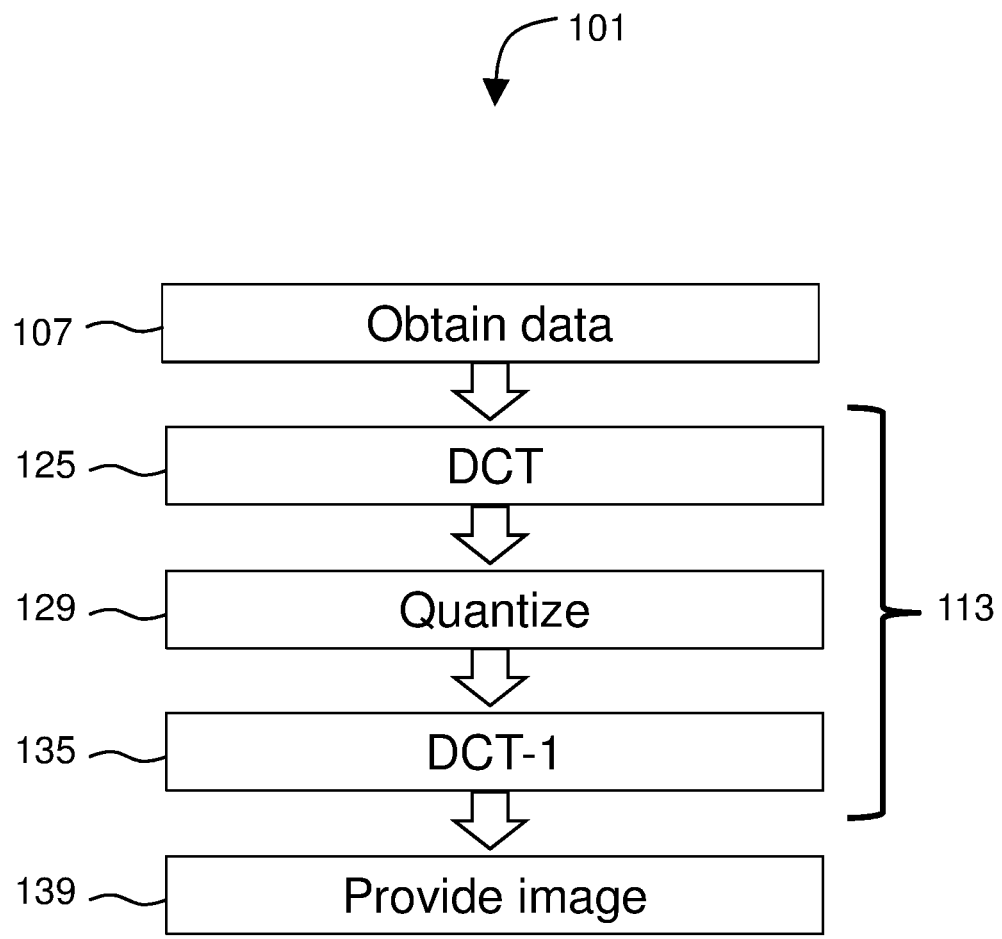
FIG. 1 diagrams a method for removing noise from images.

FIG. 1 diagrams a method 101 of removing noise from images. The method 101 includes obtaining data from at least one image sensor and performing a noise reduction step 113. The noise reduction step 113 consists of performing a discrete cosine transform (DCT) 125 on the data to get DCT values, quantizing 129 the DCT values, and performing an inverse 135 of the DCT on the DCT values to yield image data. The image data is provided 139 for displaying, broadcasting, or storing as a digital image.

In preferred embodiments, the noise reduction step is performed on an N×N block of pixels for 2<N<16, such as 8×8. Quantizing the DCT values may be done by dividing elements of the DCT values by corresponding elements in a quantization matrix and rounding the result.

In certain embodiments, the noise reduction step 113 is implemented by a high-dynamic range (HDR) video camera. In some embodiments of an HDR camera, pixel values 501 are streamed through a pipeline on a processing device 219 in real time. Real-time means that HDR video from the camera may be displayed essentially simultaneously as the camera captures the scene (e.g., at the speed that the signal travels from sensor to display minus a latency no greater than a frame of film). There is no requirement for post-processing the image data and no requirement to capture, store, compare, or process entire "frames" of images. The described method 101 and its noise reduction step 113 are applicable to pipeline processing for real-time HDR video.

Figure 2:
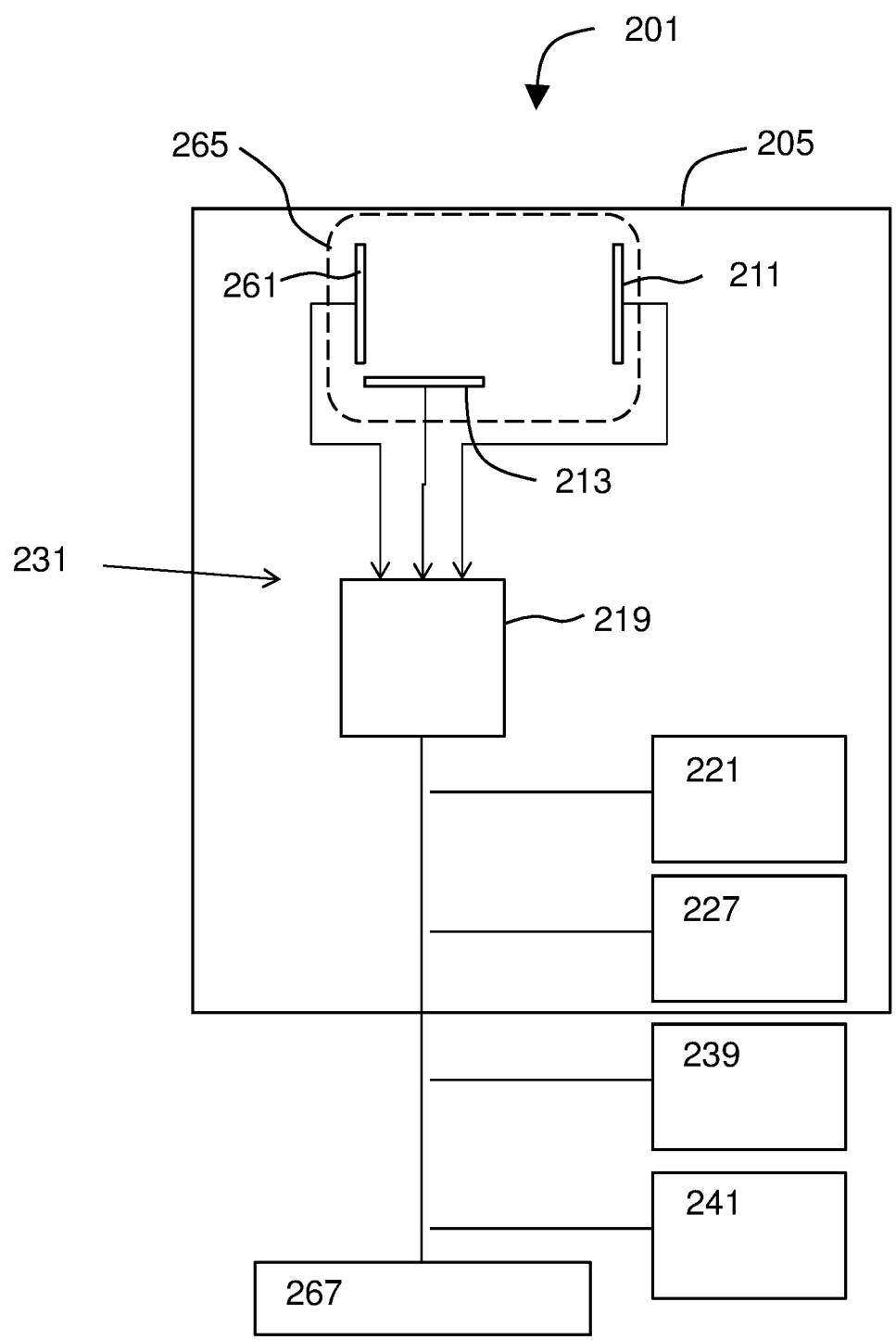
FIG. 2 shows an apparatus for HDR video processing.

FIG. 2 shows an apparatus 201 for HDR video processing. The apparatus 201 includes a processing device 219 such as a field-programmable gate array (FPGA) or an application-specific integrated circuit (ASIC). A plurality of image sensors 265 are coupled to the processing device 219. The apparatus 201 is configured to stream pixel values 501 from each of the plurality of image sensors 265 in a frame independent-manner through a pipeline 231 on the processing device 219. The pipeline 231 includes a kernel operation 413 that identifies saturated pixel values 501 and a merge module to merge the pixel values 501 to produce an HDR image.

The kernel operation 413 operates on pixel values 501 as they stream from each of the plurality of image sensors 265 by examining, for a given pixel on the HE sensor 213, values from a neighborhood 601 of pixels surrounding the given pixel, finding saturated values in the neighborhood 601 of pixels, and using information from a corresponding neighborhood 601 on the ME sensor 211 to estimate a value for the given pixel.

Various components of the apparatus 201 may be connected via a printed circuit board 205. The apparatus 201 may also include memory 221 and optionally a processor 227 (such as a general-purpose processor like an ARM microcontroller). Apparatus 201 may further include or be connected to one or more of an input-output device 239 or a display 267. Memory can include RAM or ROM and preferably includes at least one tangible, non-transitory medium. A processor may be any suitable processor known in the art, such as the processor sold under the trademark XEON E7 by Intel (Santa Clara, Calif.) or the processor sold under the trademark OPTERON 6200 by AMD (Sunnyvale, Calif.). Input/output devices according to the invention may include a video display unit (e.g., a liquid crystal display or LED display), keys, buttons, a signal generation device (e.g., a speaker, chime, or light), a touchscreen, an accelerometer, a microphone, a cellular radio frequency antenna, port for a memory card, and a network interface device, which can be, for example, a network interface card (NIC), Wi-Fi card, or cellular modem. The apparatus 201 may include or be connected to a storage device 241. The plurality of sensors are preferably provided in an arrangement that allows multiple sensors 265 to simultaneously receive images that are identical except for light level.

The method 101 and its noise reduction step 113 are applicable to a variety of image-processing applications and cameras. For example, the noise reduction 113 may be provided within a consumer device such as a smartphone or a digital camera. The noise reduction step 113 may be performed by a processor in a mobile personal device in which the at least one sensor is part of a digital camera on the mobile personal device. Optionally, providing the image data for storing as the digital image can include converting the image data into a JPEG and storing the JPEG on a computer-readable storage medium.

Figure 3:
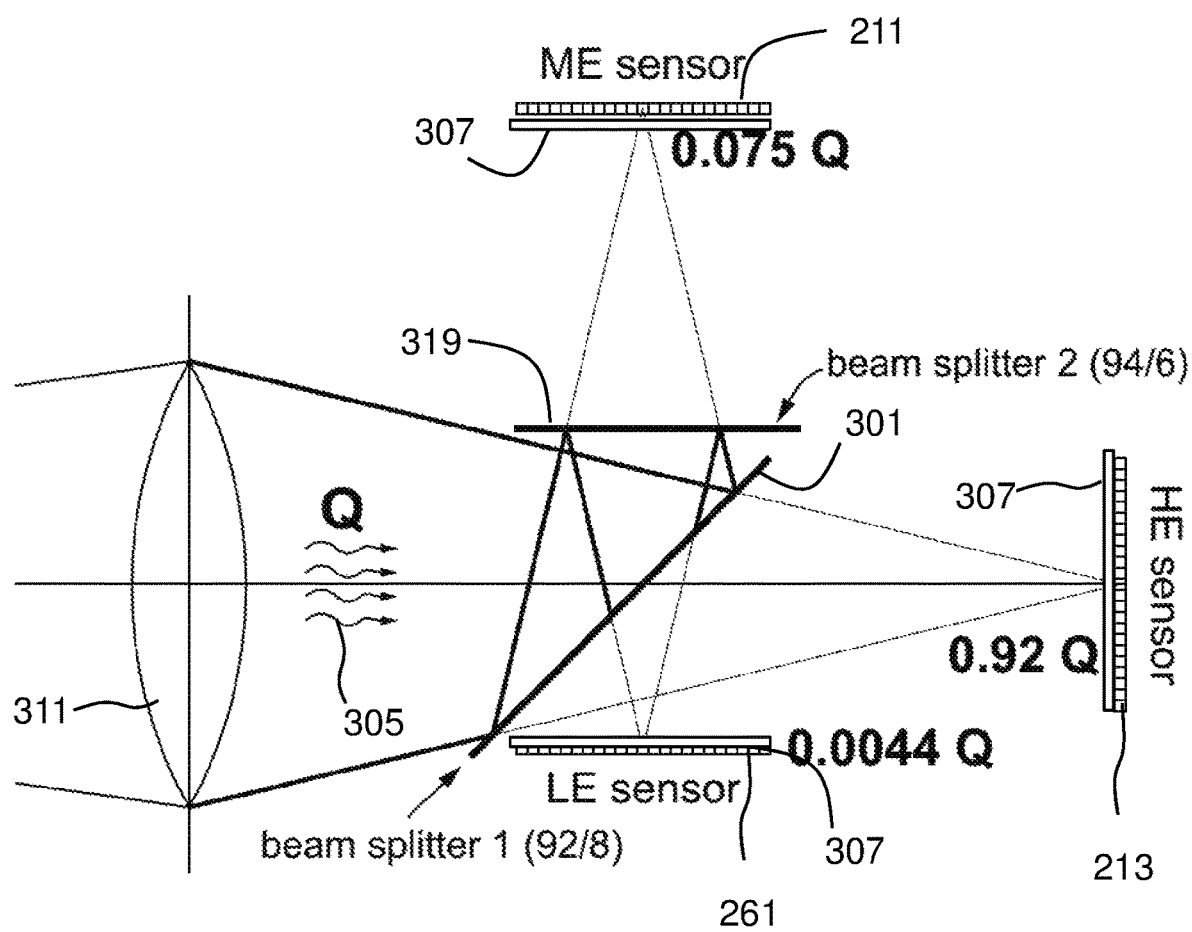
FIG. 3 shows multiple sensors for HDR video.

FIG. 3 shows an arrangement for the multiple sensors 265 for HDR video embodiments. The multiple sensors preferably include at least a high exposure (HE) sensor 213 and a middle exposure (ME) sensor 211. Each image sensor may have its own color filter array 307. The color filter arrays 307 may operate as a Bayer filter such that each pixel receives red, green, or blue light. As is known in the art, a Bayer filter includes a repeating grid of red, green, blue, green filters such that a sequence of pixel values streaming from the sensor corresponds to values for red, green, blue, green, red, green, blue, green, red, green, blue, green, . . . etc.

As shown in FIG. 3, the apparatus 201 may also include or be optically connected to a lens 311 and at least one beamsplitter 301. The HE sensor 213, the ME sensor 211, the lens 311 and the at least one beamsplitter 301 are arranged to receive an incoming beam of light 305 and split the beam of light 305 into at least a first path that impinges and HE sensor 213 and a second path that impinges on the ME sensor 211. The optical splitting system may use two uncoated, 2-micron thick plastic beamsplitters that rely on Fresnel reflections at air/plastic interfaces so their actual transmittance/reflectance (T/R) values are a function of angle. Glass is also a suitable material option. In one embodiment, the first beamsplitter 301 is at a 45° angle and has an approximate T/R ratio of 92/8, which means that 92% of the light from the camera lens 311 is transmitted through the first beamsplitter 301 and focused directly onto the high-exposure (HE) sensor 213. The beamsplitter 301 reflects 8% of the light from the lens 311 upwards (as shown in FIG. 3), toward the second uncoated beamsplitter 319, which has the same optical properties as the first but is positioned at a 90° angle to the light path and has an approximate T/R ratio of 94/6.

Of the 8% of the total light that is reflected upwards, 94% (or 7.52% of the total light) is transmitted through the second beamsplitter 319 and focused onto the medium-exposure (ME) sensor 211. The other 6% of this upward-reflected light (or 0.48% of the total light) is reflected back down by the second beamsplitter 319 toward the first beamsplitter 301 (which is again at 45°), through which 92% (or 0.44% of the total light) is transmitted and focused onto the low-exposure (LE) sensor 261.

In preferred embodiments, pixel values stream from the HE sensor 213, the ME sensor 211, and the LE sensor 261 in sequences directly to the processing device 219. Those sequences may be not synchronized as they arrive onto the processing device 219.

Figure 4:
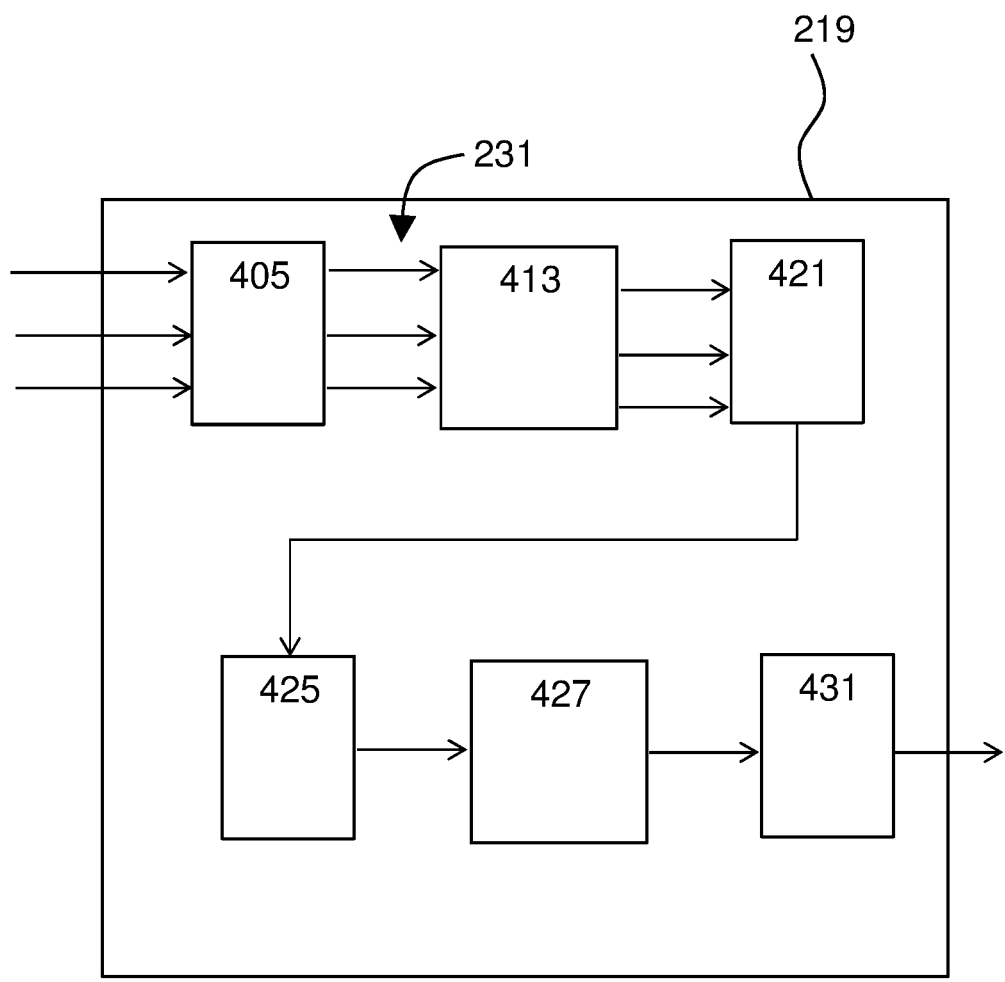
FIG. 4 shows a processing device on a video apparatus.

FIG. 4 shows the processing device 219 on the apparatus 201. The noise reduction method 101 and the noise reduction step 113 may be implemented on the processing device 219. The processing device 219 may be provided by one or more FPGA, ASIC, or other integrated circuit. Pixel values from the sensors stream through the pipeline 231 on the processing device 219. The pipeline 231 in the processing device 219 includes—in the order in which the pixel values 501 flow: a sync module 405 to synchronize the pixel values 501 as the pixel values 501 stream onto the processing device 219 from the plurality of image sensors 265; the kernel operation 413; the merge module 421; a demosaicing module 425; and a tone-mapping operator 427. The pipeline 231 may include one or more auxiliary module 431 such as a color-correction module; an HDR conversion module; and an HDR compression module.

Figure 5:
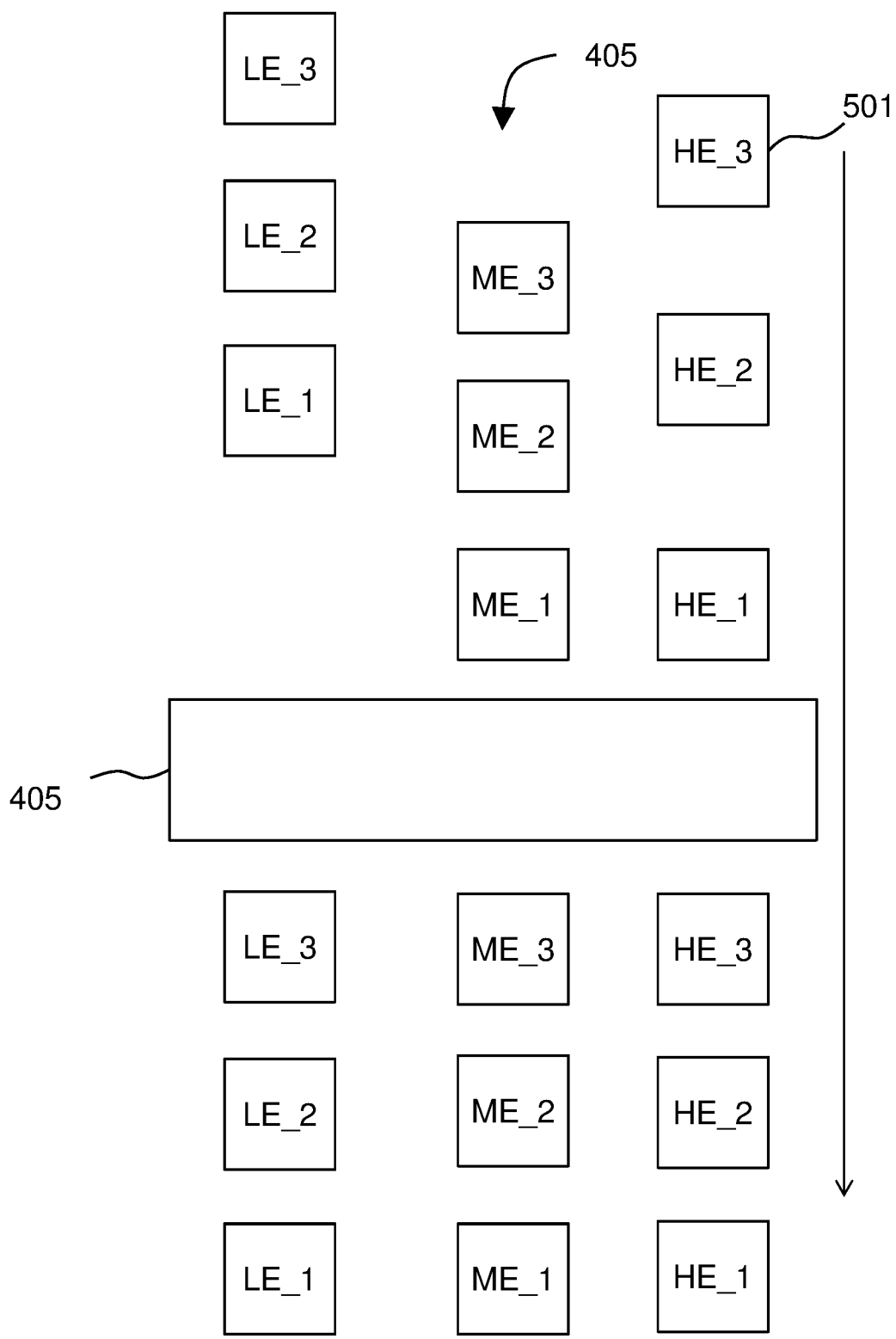
FIG. 5 shows synchronization of pixel values.

FIG. 5 shows operation of the sync module 405 to synchronize the pixel values 501 as the pixel values 501 stream onto the processing device 219 from the plurality of image sensors 265. As depicted in FIG. 5, HE_1 pixel value and ME_1 pixel value are arriving at the sync module 405 approximately simultaneously. However, HE_2 pixel value will arrive late compared to ME_2, and the entire sequence of LE pixel values will arrive late. The sync module 405 can contain small line buffers that circulate the early-arriving pixel values and release them simultaneous with the corresponding later-arriving pixel values. The synchronized pixel values then stream through the pipeline 231 to the kernel operation 413.

Figure 6:
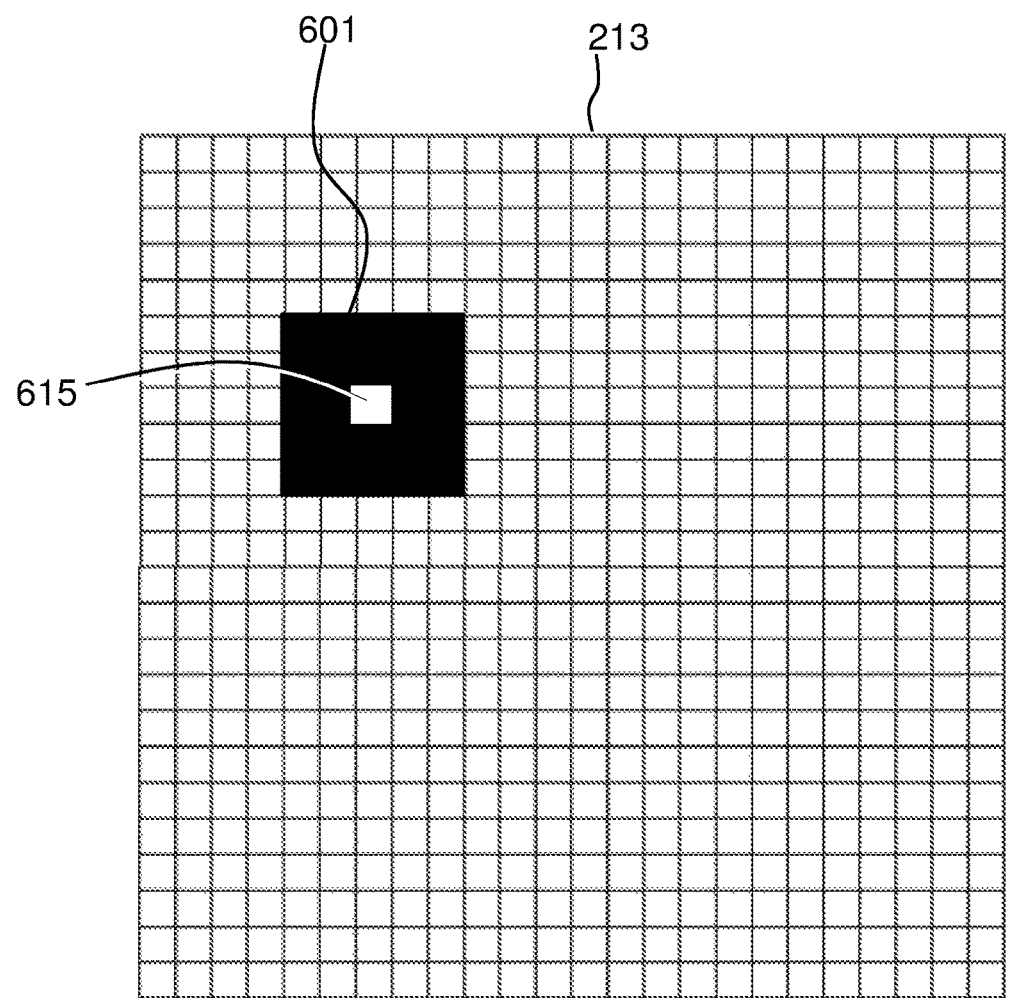
FIG. 6 illustrates a kernel operation.
Figure 6:
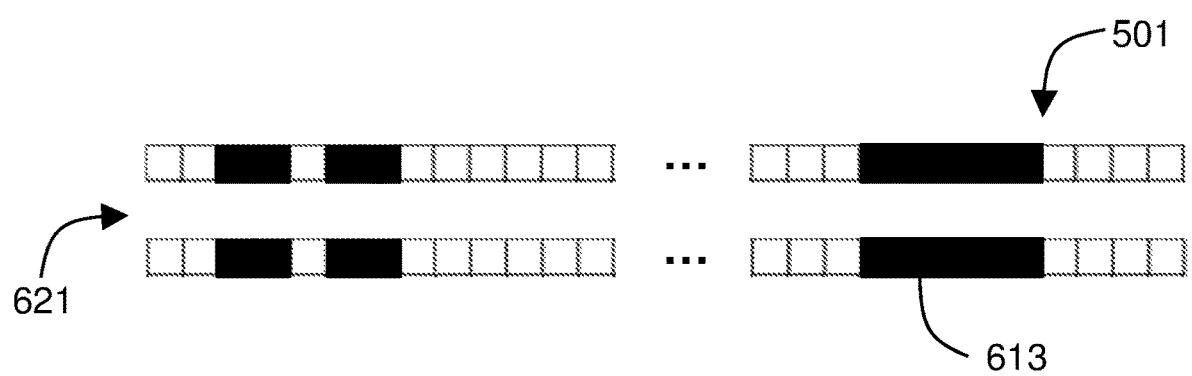

FIG. 6 illustrates how the pixel values are presented to the kernel operation 413. The top part of FIG. 6 depicts the HE sensor 213. Each square depicts one pixel of the sensor 213. A heavy black box with a white center is drawn to illustrate a given pixel 615 for consideration and a neighborhood 601 of pixels surrounding the given pixel 615. The heavy black box would not actually appear on a sensor 213 (such as a CMOS cinematic camera sensor)—it is merely drawn to illustrate what the neighborhood 601 includes and to aid understanding how the neighborhood 601 appears when the sequences 621 of pixel values 501 are presented to the kernel operation 413.

The bottom portion of FIG. 6 shows the sequences 621 of pixel values as they stream into the kernel operation 413 after the sync module 405. Pixel values 501 from the neighborhood 601 of pixels on the sensor 213 are still "blacked out" to aid illustration. The given pixel 615 under consideration can be spotted easily because it is surrounded on each side by two black pixels from the row of pixels on the sensor. There are two sequences 621, one of which comes from the depicted HE sensor 213 and one of which originates at the ME sensor 211.

Streaming the pixel values 501 through the kernel operation 413 includes examining values from a neighborhood 601 of pixels surrounding a first pixel 615 on the HE sensor 213, finding saturated values in the neighborhood 601 of pixels, and using information from a corresponding neighborhood 613 from the ME sensor 211 to estimate a value for the first pixel 615. The processing device makes comparisons between corresponding pixel values from different sensors. It may be useful to stream the pixel values through the kernel operation in a fashion that places the pixel under consideration 615 adjacent to each pixel from the neighborhood 601 as well as adjacent to each pixel from the corresponding neighborhood on another sensor. For merging 139, two registered LDR images (one high-exposure image IHE and a second medium-exposure image IME) are to be merged 139 into an HDR image IHDR. The merging 139 starts with the information in the high-exposure image IHE and then combines in data from the next darker-exposure image IME, as needed. To reduce the transition artifacts described earlier, the apparatus 201 works on each pixel location (x, y) by looking at the information from the surrounding (2k+1)×(2k+1) pixel neighborhood 601, denoted as N(x,y).

In some embodiments as illustrated in FIG. 6, the apparatus 201 uses a 5×5 pixel neighborhood 601 (k=2), and define a pixel to be saturated if its value is greater than some specific amount, for example 90% of the maximum pixel value (4096 e.g., where sensor 213 is a 12-bit CMOS sensor). Optionally, the merging 139 includes a specific operation for each of the four cases for the pixel 615 on sensor 213 and its neighborhood 601 (see FIG. 6):

Case 1: The pixel 615 is not saturated and the neighborhood 601 has no saturated pixels, so the pixel value is used as-is.

Case 2: The pixel 615 is not saturated, but the neighborhood 601 has 1 or more saturated pixels, so blend between the pixel value at IHE(x, y) and the one at the next darker-exposure IME(x, y) depending on the amount of saturation present in the neighborhood.

Case 3: The pixel 615 is saturated but the neighborhood 601 has 1 or more non-saturated pixels, which can be used to better estimate a value for IHE(x,y): calculate the ratios of pixel values in the ME image between the unsaturated pixels in the neighborhood and the center pixel, and use this map of ME ratios to estimate the actual value of the saturated pixel under consideration.

Case 4: The pixel 615 is saturated and all pixels in the neighborhood 601 are saturated, so there is no valid information from the high-exposure image, use the ME image and set IHDR(x, y)=IME(x, y).

When there are three LDR images, the process above is simply repeated in a second iteration, substituting IHDR for IHE and ILE for IME. In this manner, data is merged 139 from the higher exposures while working toward the lowest exposure, and data is only used from lower exposures when the higher-exposure data is at or near saturation.

This produces an HDR image that can be demosaiced and converted from pixel values to irradiance. This refers to transforming the (e.g., RGB) pixels into a $YC_bC_r$ color space. YCbCr may be found in the literature variously written as YCbCr, Y'CbCr, Y Pb/Cb Pr/Cr, or $Y'C_BC_R$. In a YCbCr color space, Y is the luma component and Cb and Cr are the blue-difference and red-difference chroma components. Y' (with prime) is distinguished from Y, which is luminance, meaning that light intensity is nonlinearly encoded based on gamma corrected RGB primaries. Y'CbCr color spaces are defined by a mathematical coordinate transformation from an associated RGB color space. If the underlying RGB color space is absolute, the Y'CbCr color space is an absolute color space as well; conversely, if the RGB space is ill-defined, so is Y'CbCr.

The final HDR full-color image may then be tone mapped (e.g., with commercial software packages such as FDRTools, HDR Expose, Photomatix, etc.) The noise reduction method 101 may be performed at any suitable step. In some embodiments, the noise reduction is performed on the converted irradiance values.

The apparatus 201 may be implemented using three Silicon Imaging SI-1920HD high-end cinema CMOS sensors mounted in a camera body. Those sensors have 1920× 1080 pixels (5 microns square) with a standard Bayer color filter array, and can measure a dynamic range of around 10 stops (excluding noise). The sensors are aligned by aiming the camera at small pinhole light sources, locking down the HE sensor and then adjusting setscrews to align the ME and LE sensors.

The camera body may include a Hasselblad lens mount to allow the use of high-performance, interchangeable commercial lenses. For beamsplitters, the apparatus may include uncoated pellicle beamsplitters, such as the ones sold by Edmund Optics [part number NT39-482]. The apparatus 201 may perform the steps of the method 101. Preferably, the multiple image sensors include at least a high exposure (HE) sensor 213 and a middle exposure (ME) sensor 211, and the merging includes using HE pixel values 501 that are not saturated and ME pixel values 501 corresponding to the saturated pixel values. The multiple sensors may further include a low exposure (LE) sensor 261, and the method 101 may include identifying saturated pixel values 501 originating from both the HE sensor 213 and the ME sensor 211. Because the pixel values stream through a pipeline, it is possible that at least some of the saturated pixel values 501 are identified before receiving values from all pixels of the multiple image sensors at the processing device 219 and the method 101 may include beginning to merge 139 portions of the sequences while still streaming 129 later-arriving pixel values 501 through the kernel operation 413.

Figure 7:
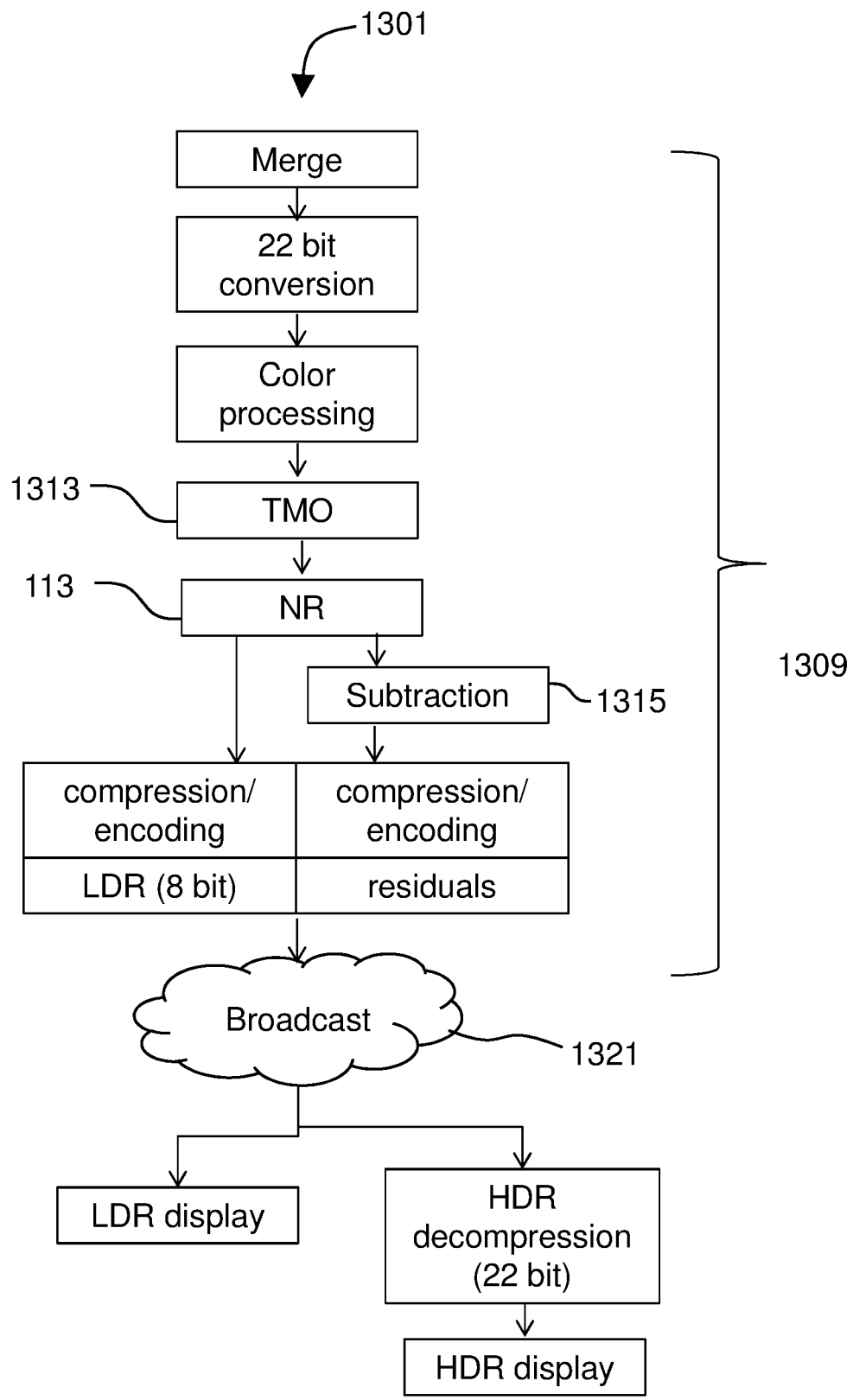
FIG. 7 illustrates combined HDR/SDR broadcasting with noise reduction.

FIG. 7 illustrates a method 1301 for combined broadcasting of high dynamic range (HDR) video with standard dynamic range (SDR) video with a noise reduction step 113. The method 1301 provides for streaming HDR and SDR video. The method 1301 includes detecting—using an array of sensors 165—information representing a series of images, processing 1309 the information, and transmitting 1321 the information for HDR and LDR display with less than one frame of delay between detection and transmission.

The pipeline includes color processing, tone-mapping, and noise reduction 101, which includes a noise reduction step 113. The noise reduction step 113 may be performed in any suitable color space. For example, in some embodiments, the method includes transforming the data from the at least one image sensor from an RGB color space into a $YC_BC_R$ color space and performing the noise reduction step in the $YC_BC_R$ color space.

Digital image capturing devices such as those embodied by FIGS. 2-3 above introduce digital noise. The digital noise can visually manifest in produced digital photographs or digital video frames such that the quality of each is significantly reduced. There are actually two types of digital noise: luminance noise and chroma noise. Luminance noise, as the name suggests, is directly related to available light or the lack thereof and generally makes an image look gritty. Chroma noise relates to splotchy fluctuations of color tone between pixels of an image. This type of noise is very unsightly and causes blotchiness of color in portions of the image. Chroma noise generally becomes more apparent in the very dark or very light areas of digital images.

The noise reduction step 113 may be implemented within a pixel-processing pipeline such as the pipeline 231 in the processing device 219. A pipeline can be implemented on a discrete image processing circuit or as an integrated circuit. In a discrete circuit design, the pipeline can be connected to existing circuitry of a digital image device. Pixels are streamed into the pipeline in N×N blocks, preferably 8×8. Thus, the incoming image data (obtained from an image sensor) is initially an 8×8 block of pixel values. Given pixel values that range from 0 to 255, those incoming N×N pixel values can be centered on 0 by subtracting 128 from each to give a matrix M. The matrix M is the starting image data that will be cleaned by the noise reduction step 113, and the output of that step will be an N×N matrix I of similar, but de-noised pixel values. A discrete cosine transform is applied to the matrix M to transform it into a matrix D of DCT coefficients.

FIG. 8 gives the formula for each DCT coefficient of the matrix D (Equation 801), where p(x,y) is the x,yth element of the image represented by the matrix p. N is the size of the block that the DCT is done one.

FIG. 9 gives the matrix T (Equation 805), which performs the operation of Equation 801 when the matrix T is used in matrix multiplication on a block of image pixel values M (that has been "leveled of" aka "centered" by subtracting 128 from each). Thus, Equation 801 and Equation 805 provide the operations useful to perform a DCT on a matrix of original pixel values. To summarize those steps of the DCT: first, 128 is subtracted from each pixel value to yield the matrix M. Then, the DCT is given by $D=TMT^{-1}$, which yields a matrix D of DCT coefficients.

Figure 10:
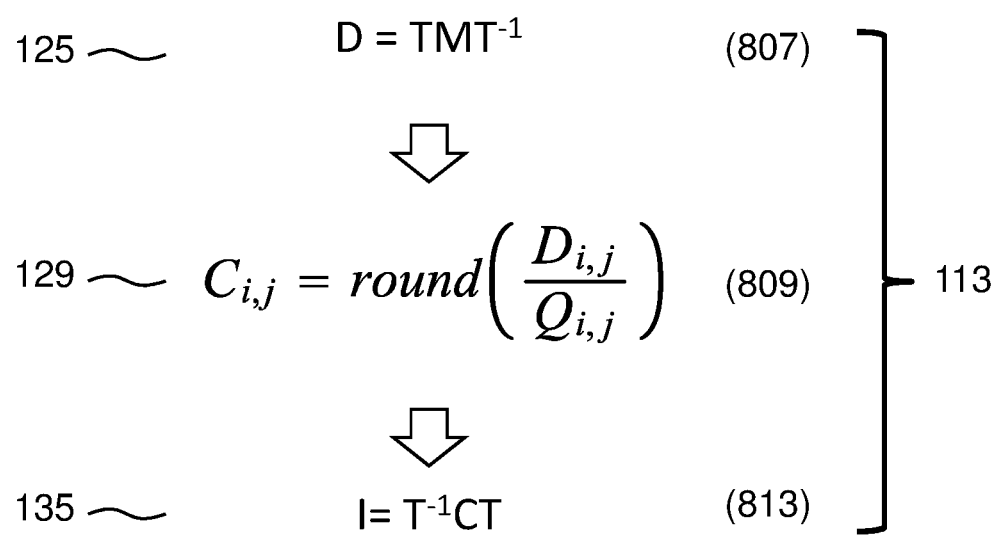
FIG. 10 gives a set of operations to perform noise reduction.

FIG. 10 sets forth a set of operations to perform the noise reduction step 113. The matrix D is a matrix of DCT coefficients provided using Equation 801. Those DCT coefficients are quantized using a matrix of quantization coefficients Q according to equation 809. Any suitable matrix can be used for the quantization coefficients Q and, in fact, the default quantization coefficients from a JPEG algorithm may be used.

In equation 809, the rounding operation truncates values after a decimal point and, in a simple version, simply rounds to integers. E.g., if Dij/Qij is, say, 10.567, then round(Dij/Qij) is 10. The quantized coefficients are then subject to an inverse of the DCT as per, for example, equation 813 to give de-noised image data in the matrix I corresponding a cleaned-up version of the original N×N block. Some of the input equations are explained in Ken Cabeen and Peter Gent, Image Compression and the Discrete Cosine Transform, Math 45, College of the Redwoods (11 pages), incorporated by reference. It is important to note that the noise reduction step 113 consists of operating a processing device 219 such as an FPGA or ASIC on an N×N matrix of pixel values N to output an N×N matrix of pixel values I. The noise reduction step 113 can be performed for successive N×N blocks from an input image and the output is a de-noised version of the input image. Equations 807, 809, and 813 illustrate how to obtain I, which in preferred embodiments is an 8×8 block of de-noised image pixels. No compression or encoding need occur within the image processing step 113.

In embodiments of the disclosure, a pipeline receives each 8×8 block of pixel values in an RBG color space. The pipeline performs color transformation on each block to produce an 8×8 image block that is in the YCbCr color space. The YCbCr color space allows the pipeline to separate the luma (or luminance) domain from the chroma (or color) domain of the digital image. The pipeline then includes distinct channels to remove noise contained each of the luma and chroma domains of the digital image. Advantageously, this bifurcated process enables noise reduction such that noise unique to each domain of the image can be specifically targeted and removed.

For example, the human visual system is more sensitive to luminance than it is to color. In other words, the human eye is better able to perceive discrete changes in the luminance domain than it is able to in the color domain. Accordingly, the pipeline can enable an aggressive noise filtering strategy in the color domain (e.g., one that may not only remove noise but also actual color information (i.e., non-noise data)) such that the human visual system is not able to perceive the loss in actual color information. In the current example, color information in the digital image is downsampled. In particular, the color information is sampled in either one or both of the rows and columns of the 8×8 block such that the color information in one pixel is used to represent the color information in a predetermined number of the pixel's neighbors. This predetermined number is set by the 'sample rate'. Thus, the sampling can remove unwanted noise while keeping actual color information. The 8×8 block is essentially color smoothed by enabling the color information in the one pixel to represent the color information in a predetermined number of its neighbors. The sampling rate can be dynamically adjusted per 8×8 block of pixel values as a function of the location of the block in the overall image. For instance, chroma noise becomes more apparent in the very dark or very light areas of digital images and, as such, the sampling rate can be increased in the image blocks corresponding to those areas. Although not illustrated, some embodiments may also downsample the luminance domain of an image.

As is known, any image can be represented as combination of a particular set of frequencies. Because noise is generally associated with quick changes in luminance or color in a short space, high frequency portions of the image are generally associated with noise. As such, those high frequency components that are generally associated with noise can be removed from the image.

To that end, the pipeline first transforms each 8×8 block of pixel values as represented in the spatial domain (i.e., each pixel value corresponds to a particular location in an image) into the frequency domain. In particular, a discrete cosine transform (DCT) (e.g., via Equation 805) is applied to the matrix M to transform it into an 8×8 matrix D of DCT coefficients. Each unit of the matrix D represents a particular cosine frequency and each DCT coefficient contained in a unit is a weight identifying how much the particular cosine frequency contributes to the overall 8×8 image. Thus, there are 64 possible cosine frequencies that when combined in a particular way can generate any 8×8 image. The matrix D is arranged such that the cosine frequencies increase from the top-left to the bottom-right of the matrix.

In order to remove those high frequency components, the pipeline quantizes the 8×8 matrix of DCT coefficients by using a matrix of quantization coefficients Q. Any suitable quantization matrix Q can be used and, in fact, the default quantization coefficients from a JPEG algorithm may be used. In particular, each coefficient value in the matrix D is divided by a particular quantization coefficient in the matrix Q (e.g., $D_{ij}/Q_{ij}$, where ij represents a particular location in the matrices D and Q). The quantization further truncates values after a decimal point and, in a simple version, simply rounds to integers. E.g., if $D_{ij}/Q_{ij}$ is, say, 10.567, then round ($D_{ij}/Q_{ij}$) is 10. Thus, the quantization matrix Q is selected such that weightings of high frequency components are reduced to a fractional number and, thus, when the fractional number is truncated, the coefficient is turned to zero. In other words, the frequency corresponding to that coefficient is given no weight in the overall 8×8 image so that the noise associated with that frequency is removed from the image. A matrix C of quantized values is then produced by the pipeline that includes the quantized values produced from the quantization process discussed above.

The pipeline begins reformatting the image data to reproduce a displayable image. Accordingly, the pipeline conducts performs inverse quantization on the matrix C. In particular, each value in the matrix C is multiplied by corresponding values in the matrix Q (e.g., $C_{ij}*Q_{ij}$). This step yields an 8×8 matrix D' of reverse quantized DCT coefficients. As stated above, this will yield DCT coefficients having a value of '0' for those coefficients corresponding to frequencies associated with noise (e.g., high frequency components of the digital image).

The reverse quantized DCT coefficients are then subject to an inverse of the DCT to give de-noised image data in the matrix I corresponding a cleaned-up version of the original N×N block. It is important to note that the image compress step 113 consists of operating a processing device 219 such as an FPGA or ASIC on an N×N matrix of pixel values N to output an N×N matrix of pixel values I. The image processing step 113 can be performed for successive N×N blocks from an input image and the output is a de-noised version of the input image.

In addition, an optional low-pass filter may be introduced at any point in the pipeline to filter noise from any frequency related 8×8 matrix of data produced in the pipeline (e.g., on any of the matrices D, C, and I). The low-pass filter can be configured to remove certain ranges of frequencies from image data. In particular, the pipeline may include multiple low-pass filters, each including different filtering parameters that are specific to particular camera devices, environmental settings in which an image is being captured, or any other hardware or environmental factor. Accordingly, noise that may be introduced that is specific to a particular set of circumstances may be dynamically accounted for and removed by utilizing such a selecting a certain filter from the low-pass filters.

In one example, the low-pass filter operates to remove high frequency components and may be implemented in any suitable way. For example, in certain embodiments, the low pass filter sets to zero those DCT coefficients that correspond to certain frequencies above a predetermined threshold (e.g., those frequencies associated with noise). In some embodiments, the low pass filter compares the absolute value of each of the coefficients in the DCT coefficient matrix D to a predetermined value. Based on comparison, the low-pass filter identifies which of the DCT coefficients are below the threshold. The low-pass filter sets the values of the identified DCT coefficients to zero. By setting the value of a DCT coefficient to zero, a frequency component associated with that coefficient does not contribute to an image. As such, the low pass filter removes noise components from the image data. The output of the low-pass filter is an 8×8 matrix Df that includes filtered DCT coefficients. The remaining steps of the pipeline operate on this matrix Df in the same manner as described above.

In another example, the low-pass filter operates on the matrix C of quantized DCT coefficients. For instance, the low-pass filter sets to zero all of the quantized coefficients corresponding to frequencies above a certain cutoff frequency (e.g., those frequencies associated with noise). In certain embodiments, the low pass-filter compares the absolute value of each non-zero quantized DCT coefficient in the quantized matrix C to a predetermined threshold. Based on comparison, the low-pass filter identifies which of the non-zero coefficients are below the threshold. The low-pass filter sets the values of the identified non-zero quantized coefficients to zero. By setting the value of the identified quantized coefficients to zero, a frequency component associated with that coefficient does not contribute to an image. As such, the low pass filter removes noise components from the image data. The output of the low-pass filter is an 8×8 matrix Cf of filtered quantized coefficients. The remaining steps of the pipeline operate on this matrix Cf in the same manner as described above.

The described methods and devices can produce a de-noised HDR video signal. With reference back to FIG. 7, the system can include a module for subtraction 1315 that, in real-time, subtracts the SDR signal from the HDR signal (HDR−SDR=residual). What flows from the subtraction module is a pair of streams—the SDR video signal and the residual signal. Preferably, all of the color information is in the SDR signal. At this stage the HDR signal may be subject to HDR compression by a suitable operation (e.g., JPEG or similar). The pair of streams includes the 8-bit SDR signal and the compressed HDR residual signal, which provides for HDR display. This dual signal is broadcast over a communication network and may in-fact be broadcast over television networks, cellular networks, or the Internet. A device that receives the signal displays the video according to the capacity of that device. An SDR display device will "see" the 8-bit SDR signal and display a video at a dynamic range that is standard, which signal has also had a certain TMO applied to it. An HDR display device will decompress the residuals and combine the dual streams into an HDR signal and display HDR video.

What is claimed is:

1. A method of image noise reduction, the method comprising:
    obtaining at a processing device within a video camera image data simultaneously from a plurality of image sensors of the video camera wherein the plurality of image sensors simultaneously form image data that are identical but for light level;
    flowing the image data as pixel values through a video processing pipeline on the processing device, wherein the pipeline performs
        a kernel operation that identifies saturated pixel values,
        a merge module to merge the pixel values to produce high-dynamic range (HDR) image data,
        performing a discrete cosine transform (DCT) on blocks of the HDR image data to obtain DCT values,
        quantizing the DCT values,
        conducting an inverse DCT thereby to produce uncompressed noise-reduced image data; and
    outputting uncompressed noise-reduced video from the camera in real-time while the camera is in operation.

2. The method of claim 1, wherein the video processing pipeline is a high dynamic range pipeline.

3. The method of claim 2, further comprising transforming the HDR image data from an RGB color space into a YCbCr color space and performing the noise reduction step in the YCbCr color space.

4. The method of claim 1, further comprising exposing said image data to a low-pass filter.

5. The method of claim 1, further comprising synchronizing the pixel values from each of the plurality of image sensors at a sync module on the processing device.

6. The method of claim 5, wherein each of the sensors includes a Bayer filter and further wherein the sync module contains line buffers that circulate the early-arriving pixel values and release the early-arriving pixel values simultaneous with corresponding later-arriving pixel values.

7. The method of claim 5, wherein the pipeline performs the following steps in the recited order: synchronize, the kernel operation, a tone-mapping operation, and the noise reduction step.

8. The method of claim 5, wherein the plurality of image sensors are each positioned with respect to at least one beamsplitter and a lens of the video camera such that incoming light is split onto the plurality of image sensors so that each image sensor senses an image that is identical but for light level.

9. A method for removing noise from a real-time stream of digital image data, the method comprising:
    receiving at a chip in a video camera data obtained simultaneously from a plurality of image sensors of the video camera, wherein the plurality of image sensors are each positioned with respect to at least one beamsplitter and a lens of the video camera such that incoming light is split onto the plurality of image sensors so that the image sensors simultaneously form image data that are identical but for light level;
flowing the data as pixel values through a pipeline on the chip, wherein the pipeline performs
    a kernel operation that identifies saturated pixel values,
    a merge module to merge the pixel values to produce high-dynamic range (HDR) data,
    downsampling at least a portion of the HDR data in order to remove a first portion of the noise,
    frequency domain processing the HDR data to remove a second portion of the noise by a noise reduction operation operating on the chip as a self-contained loop with pixels flowing in and corresponding noise-reduced pixels flowing out wherein the noise reduction operation consists of
        converting by discrete cosine transform (DCT) the data into the frequency domain, wherein the data are expressed as DCT coefficients representing a combination of distinct frequencies,
        identifying a portion of said distinct frequencies as being associated with a second portion of the noise, and
        removing the identified portion of said distinct frequencies by quantizing the DCT coefficients;
    converting remaining image data to yield noise-reduced image data; and
    providing the data from the video camera for displaying, broadcasting, or storing as a video in real-time while performing the receiving step.

10. The method of claim 9 wherein the data are transformed from a first color space into a second color space.

11. The method of claim 10, wherein the first color space is an RGB color space and the second color space is a YCbCr color space.

12. The method of claim 9, further comprising exposing at least a portion of said data to a low pass filter.

* * * * *